United States Patent [19]
Getman

[11] 3,982,768
[45] Sept. 28, 1976

[54] DOLLY

[76] Inventor: Alvin Dean Getman, 3710 Stewart Ave., Los Angeles, Calif. 90066

[22] Filed: Oct. 10, 1972

[21] Appl. No.: 295,878

[52] U.S. Cl. .............................. 280/79.1; 280/764
[51] Int. Cl.² ........................................... B62B 1/04
[58] Field of Search ................. 280/79.1, 35, 47.15, 280/47.16, 47.20, 150 A

[56] References Cited
UNITED STATES PATENTS

| 1,262,853 | 4/1918 | Schrankel | 280/47.15 X |
| 1,329,995 | 2/1920 | Oubridge | 280/47.16 X |
| 1,538,054 | 5/1925 | Ohnstrand | 280/47.16 |
| 2,773,696 | 12/1956 | George | 280/47.15 |
| 3,295,861 | 1/1967 | Lull | 280/47.16 |

FOREIGN PATENTS OR APPLICATIONS

| 677,437 | 8/1952 | United Kingdom | 280/35 |

Primary Examiner—M. H. Wood, Jr
Assistant Examiner—R. Schrecengost
Attorney, Agent, or Firm—Thomas A. Fournie

[57] ABSTRACT

A dolly for moving automobiles has structure stably mounted on a plurality of casters which defines first and second horizontally aligned and laterally spaced apart cradles for receiving and supporting an axle or other structural member on the underside of an automobile. An additional caster may be mounted on the dolly in an extended position to prevent the dolly from tipping over while moving an automobile when the dolly is rolled across a crack or other obstruction. The dolly may be designed for selectively adjusting the lateral distance between the defined first and second spaced apart cradles.

10 Claims, 6 Drawing Figures

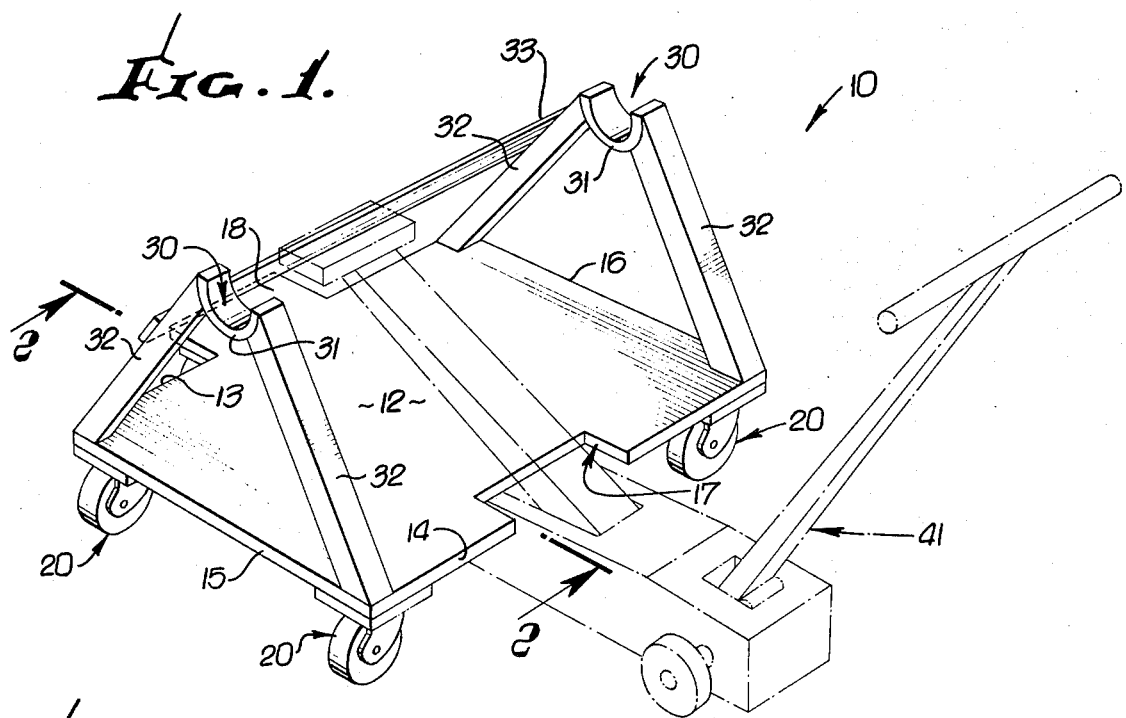
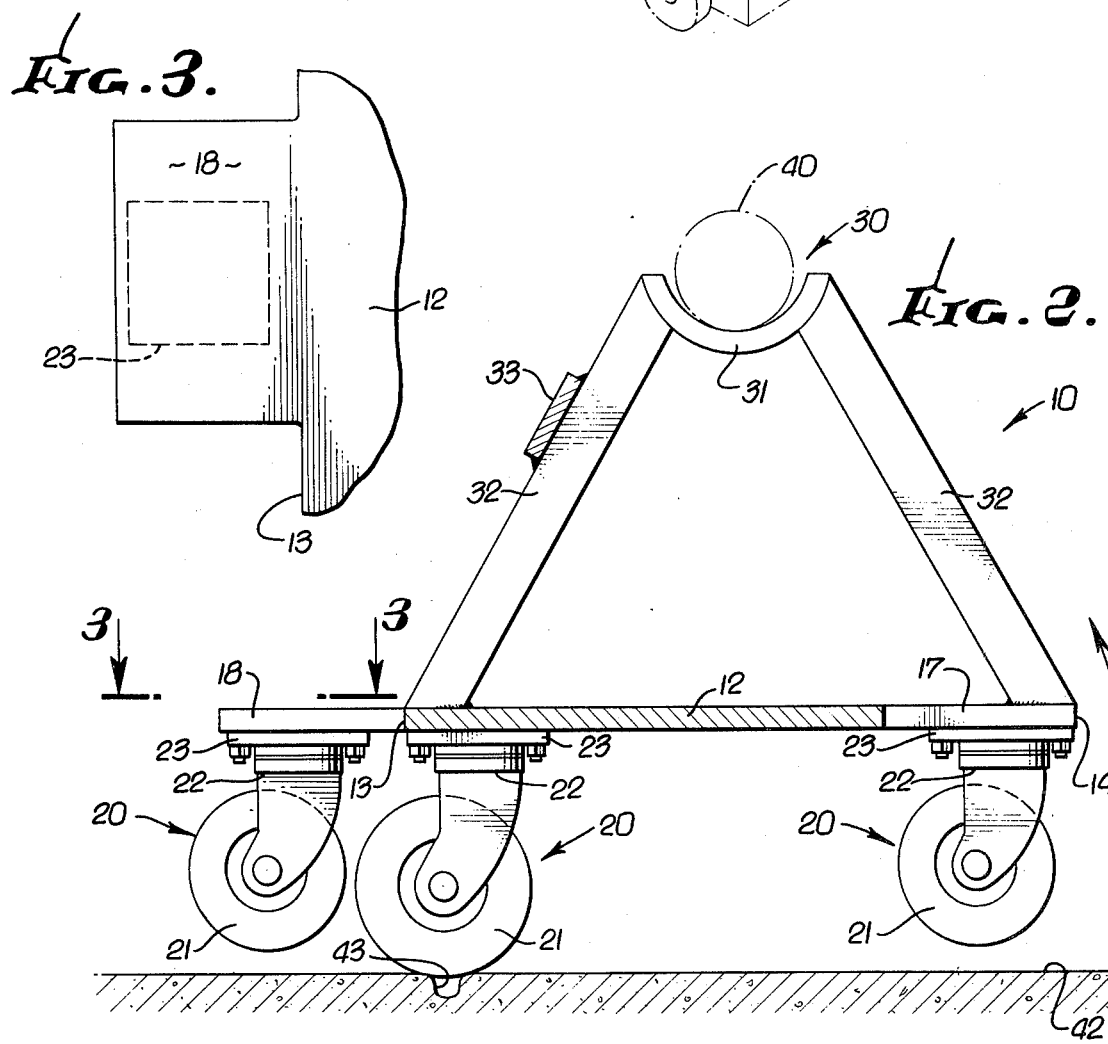

U.S. Patent  Sept. 28, 1976  Sheet 2 of 2  3,982,768
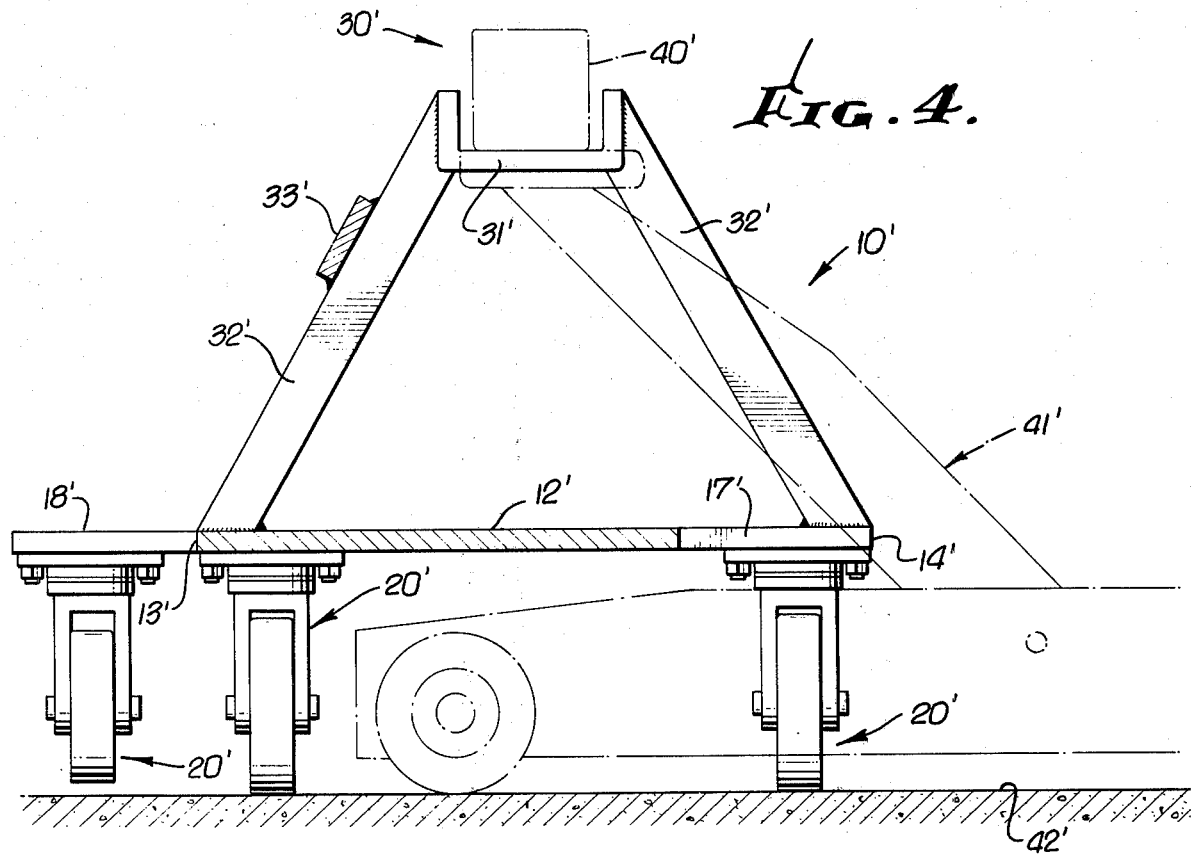
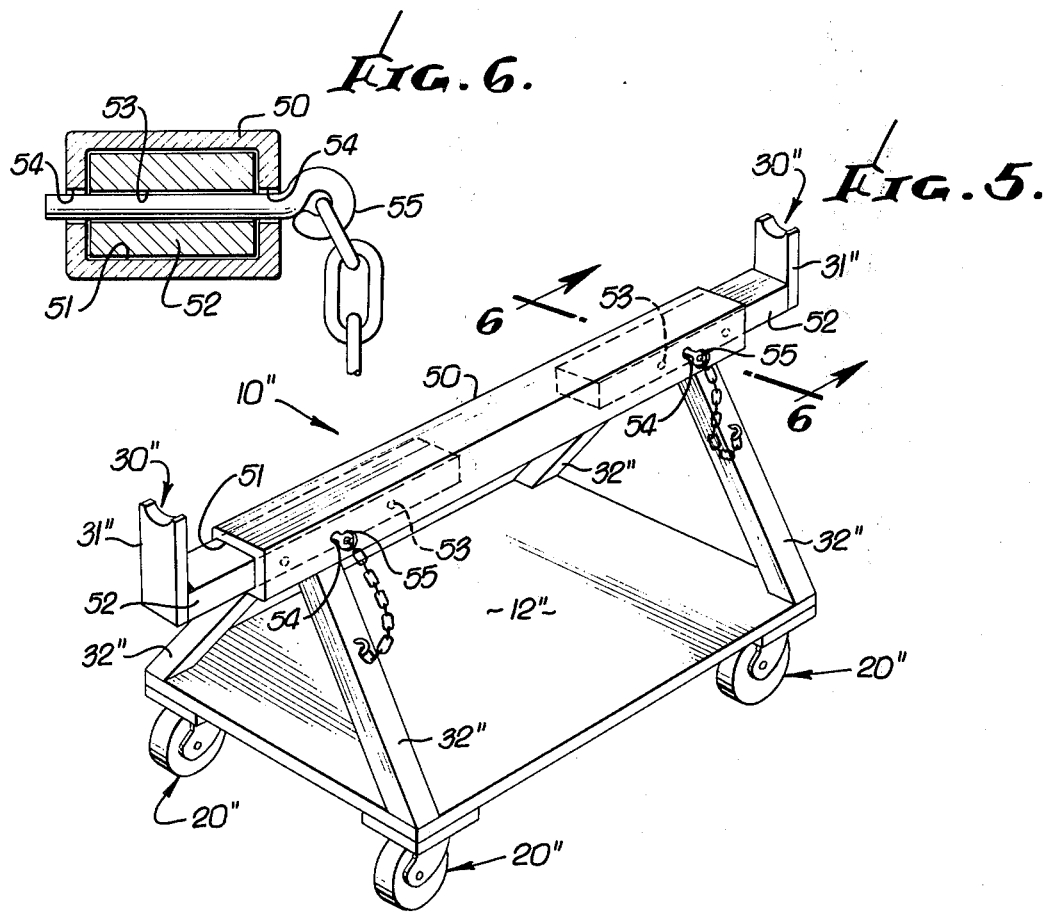

DOLLY

BACKGROUND OF THE INVENTION

The present invention relates to dollies, and more particularly to an improved dolly suitable for use to support and move automobiles.

Heretofore, various arrangements have been devised for supporting automobiles with their wheels removed in elevated positions. Generally, however, these prior art devices have had one or more of the following disadvantages. Firstly, many prior art devices have lacked stability. Consequently, the use of such devices as dollies for moving automobiles was unsafe and a quite hazardous practice. Secondly, many of the devices were not capable of supporting the entire front or back end of an automobile, but rather were only designed for holding up one side of an automobile end. Further, certain prior art devices, while being relatively stable and capable of supporting the entire end of an automobile, could not be moved in all directions and consequently were not suitable for use to move automobiles in confined areas like automobile garages.

SUMMARY OF THE INVENTION

It is, accordingly, an object of the present invention to provide an improved dolly suitable for supporting and moving automobiles characterized by being strong, inexpensive to manufacture, extremely stable and safe to use.

It is further an object of the present invention to provide an improved dolly as set forth characterized by being capable of supporting the entire front or rear end of an automobile.

It is additionally an object of the present invention to provide an improved dolly as set forth characterized by being movable across a horizontal surface in all directions so as to be suitable for use in garages and other confined areas.

It is also an object of the present invention to provide an improved dolly as set forth which is mounted on a plurality of casters spaced apart and positioned to stably transfer weight on the dolly from one caster to another when certain casters on the dolly are rolled across a crack or other obstruction thereby to prevent the dolly from tipping over.

In accomplishing these and other objects, there is provided in accordance with the present invention a dolly for moving automobiles having structure stably mounted on a plurality of casters. The structure defines first and second horizontally aligned laterally spaced apart cradles for receiving and supporting an axle or other structural member on the underside of an automobile. An additional caster may be mounted on the dolly in an extended position to prevent the dolly from tipping over while moving an automobile when the dolly is rolled across a crack or other obstruction. The dolly may be designed for selectively adjusting the lateral distance between the defined first and second spaced apart cradles.

Additional objects of the present invention reside in the specific construction of the exemplary embodiments of dollies hereinafter particularly described in the specification and shown in the several drawings.

BRIEF DESCRIPTION OF THE DRAWINGS

FIG. 1 is a perspective view of one embodiment of dolly according to the present invention.

FIG. 2 is a view taken along the line 2—2 of FIG. 1.

FIG. 3 is a view taken along the line 3—3 of FIG. 2.

FIG. 4 is a side elevation view of another embodiment of dolly according to the present invention taken like the view illustrated in FIG. 2.

FIG. 5 is a perspective view of yet another embodiment of dolly according to the present invention.

FIG. 6 is a view taken along the line 6—6 of FIG. 5.

DETAILED DESCRIPTION OF THE PREFERRED EMBODIMENTS

Referring to the drawings in more detail, there is shown in FIGS. 1–3 a dolly generally designated by the numeral 10. The dolly 10 has rigid base structure formed by a planar member 12. The planar member 12 is substantially rectangular in shape and is preferably made of steel. The plate 12 has a forward edge 13, a rear edge 14 and end edges 15 and 16. The forward and rear edges 13 and 14 of the planar member 12 are longer than the end edges 15 and 16. The longitudinal axis of the planar member 12 is defined as an imaginary line extending through the midpoints of the platform end edges 15 and 16.

The platform member 12 has a cutout 17 formed centrally in its rear edge 14. The cutout 17 is preferably rectangular in shape. A planar member 18 is mounted preferably centrally on the forward edge 13 of the platform member 12 to form part of the base structure of the dolly 10. The planar member 18 extends from the platform forward edge 13 in the plane thereof. The planar extension member 18 may be conveniently formed by welding to the platform edge 13 the rectangular portion cut from the rear edge 14 to form the cutout 17.

Mounted on the lower side of the base of the dolly 10 are five conventional casters 20. The casters 20 are preferably made of steel. Each caster 20 is made up of a wheel 21 mounted for rotation in a swivel structure 22. The swivel structure 22 is secured on mounting plates 23 and the casters 20 are mounted on the dolly base by bolting the mounting plates 23 thereto.

One of the casters 20 is mounted in each of the corners of the platform member 12 on the lower side thereof to extend vertically downwardly therefrom. Thereby, the casters 20 mounted on the platform 12 define a rectangular shape. The other caster 20 is mounted centrally on the lower side of the planar extension 18 to extend substantially vertically downward therefrom. The caster 20 mounted on the planar extension 18 is preferably positioned equidistant from the two casters 20 mounted adjacent the platform edge 13.

The two casters 20 mounted adjacent the forward platform edge 13 are of the same size, such as 5 inches in diameter. The two casters 20 mounted adjacent the rear platform edge are of the same size but smaller than the casters 20 mounted adjacent the forward edge 13. The casters 20 mounted adjacent the rear edge 14 may be, for example, 4 inches in diameter. The caster 20 mounted on the extension 18 is smaller than the casters 20 mounted adjacent the platform edge 14 and may be, for example, 3 inches in diameter. Thereby, the caster 20 mounted on the extension 18 extends downwardly to a point a selected distance above the common plane defined by the lowermost positioned portions of the casters 20 mounted on the platform 12.

A pair of upwardly opening horizontally aligned laterally spaced apart cradles 30 for receiving and supporting the rear axle of an automobile are shown defined on the dolly 10 in positions substantially vertically above the midpoints of the end edges 15 and 16 of the platform member 12. Each cradle 30 is defined by a semicylindrical cradle member 31 supported in position by a pair of brace members 32. The cradle members 31 and brace members 32 are all preferably made of steel. The brace members 32 mounted adjacent the forward platform edge 13 are braced by a horizontally extending brace member 33, preferably made of steel, which is secured therebetween.

The brace members 32 are welded in the upper corners of the platform 12 and extend upwardly at the same angles therefrom along the platform end edges 15 and 16 to define vertically extending brace structures in the form of isosceles triangles. The brace members 32 are welded to the semicylindrical cradle members 31 to support the cradle members above the midpoints of the platform edges 15 and 16. Thereby, the cradle members 31 are supported in alignment with each other along a horizontally extending line. This horizontal line lies parallel to and is positioned vertically above the longitudinal axis of the platform 12. It is noted that it may be desirable to connect the braces 32 to the platform 12 at points exactly over the caster swivel structure 22 to prevent any bowing of the platform 12 which might tend to occur due to weight supported by the cradles 30.

Each of the cradle members 31 defines in the dolly 10 along their horizontal line of alignment upwardly opening channels. The channels are open at their ends and the axes of the channels coincide with the horizontal line along which the cradle members 31 are aligned.

In operation, the dolly 10 may be used in the following manner to support and move an automobile. The automobile rear axle 40, shown in phantom in FIG. 2 is first jacked up by operating a conventional automobile jack 41, shown in phantom in FIG. 1. The dolly 10 is slid under and aligned beneath the jacked up rear axle 40. It is noted that the cutout 17 allows the dolly 10 to fit around the jack structure holding up the automobile axle 40. The automobile jack 41 is then operated to lower the axle 40 into the spaced apart cradles 30 formed by the semicylindrical seat members 31, as shown in FIG. 2.

The automobile and its rear end may then be moved about by rolling the dolly 10 along the substantially horizontal surface 42 upon which it is positioned. The front end of the automobile automatically follows rolling on the automobile front wheels. Should a crack 43 such as shown in FIG. 2 or another similar type obstruction be encountered, the dolly 10 may be stably rolled thereacross by rolling it with its forward platform edge 13 positioned ahead. The dropping of the forward set of casters 20 into the crack 43 temporarily halts the movement of the dolly 10. As a result, the momentum of the dolly 10 tilts it forward lifting the rear set of casters 20 from the surface 42 while moving the caster 20 mounted on the extension 18 downwardly into contact with the ground surface 42. The caster 20 mounted on the extension 18 prevents the dolly 10 from tipping over so that it may be rolled across the crack 43. Once the crack 43 has been crossed, the weight of the automobile tilts the dolly 10 rearwardly so that it again rests on the four casters 20 mounted on the platform 12.

FIG. 4 illustrates another embodiment of dolly. This dolly is designated by the numeral 10'. The dolly 10' is constructed like the dolly 10 with the following noted exceptions. Similar parts in the dolly 10' are designated with the same reference numerals with a prime added used in connection with the dolly 10.

The dolly 10' instead of having semicylindrical cradle members 31 has square or rectangularly shaped cradle members 31'. The cradle members 31' may be formed, for example, by sections of U-channel. The upwardly opening rectangularly shaped cradle members 31' are designed for engaging a square shaped laterally extending frame member 41' of the type commonly found on the underside of the forward ends of automobiles. The dolly 10' instead of having its platform member 12 mounted on casters 20 of different sizes is mounted on casters 20' which are all of the same size. The caster 20' mounted on the extension 18' is of a smaller size than the casters 20 mounted on the platform 12. The dolly 10' operates in substantially the same manner as the dolly 10.

FIGS. 5 and 6 illustrate yet another embodiment of dolly. The dolly thereshown is designated by the numeral 10'' and does not include the safety provision of a fifth caster mounted on an extension. Similar parts of the dolly 10'' are designated by the same reference numerals with a double prime added heretofore used in connection with the above described dollies 10 and 10'.

In the dolly 10'' the lateral positioning of the semicylindrically shaped cradle members 30'' is adjustable so that the lateral distance between the spaced apart cradle members may be selectively set. A structural member 50, preferably made of steel, is mounted to extend horizontally between the braces 32''. The structural member 50 is hollow, has open ends and defines a horizontally extending rectangular guide channel 51 between its open ends. The axis of the channel 51 is parallel to and positioned vertically over the longitudinal axis of the platform member 12''. Interfitted in the ends of the guide channel 51 defined by the rectangular guide member 50 are appropriately dimensioned carriage members 52. The carriage members 52 are preferably steel and have secured to their outer ends the upwardly extending cradle members 31'' which define the cradles 30''. The carriage members 52 slidably interfit within the guide channel 51 so that the lateral positions of the cradle members 31'' may be selectively set.

A plurality of holes 53 are formed in the carriage members 52 to extend transversely therein. A vertically aligned hole 54 is formed through the side of the member 50 near each end thereof. Captive keys 55 are secured on the dolly 10'' near each end of the structural member 50. The keys 55 are designed for interfitting in the holes 53 and 54 and function as key means for securing the carriage members 52 in selected positions in the guide channel 51.

In operation of the dolly 10''', the lateral spacing of the cradle members 31'' is set. The dolly 10'' is then positioned under an axle or frame member on the underside of an automobile which is to be supported. The axle or frame member is next lowered into the cradle members 31''. The automobile may be now moved as desired by rolling the dolly 10'' in any selected direction. It is noted that casters 20'' of the dolly 10'' are all preferably of the same size.

Although I have herein shown and described my invention in what I have conceived to be the most practical and preferred embodiment it is recognized that departures may be made therefrom within the scope of my invention.

I claim:

1. A dolly for moving an automobile, comprising:
   a planar rigid substantially rectangular platform member, said platform member having a forward edge, a rear edge and two end edges, said platform member having a longitudinal axis extending through the midpoints of said end edges, said platform having an upper and lower surface;
   a caster mounted on the lower surface of said platform member in each of its four corners to project vertically downward therefrom, said two casters mounted along the forward edge of said platform member being of the same size, said two casters mounted along the rear edge of said platform member being of the same size;
   first and second cradle members, each of said cradle members defining a channel along an axis, said channel being open at its ends and along its length for receiving a structural member on the underside of an automobile;
   first and second brace structure mounted on the upper surface of said platform member adjacent one and the other end edges thereof, said first and second brace structure extending upwardly in a substantially vertical plane;
   means mounting said first and second cradle members on said first and second brace structures, respectively, in laterally spaced apart positions vertically above the longitudinal axis of said platform member with their channels opening upwardly and their axes aligned along a horizontally extending line substantially parallel with the longitudinal axis of said platform member; and
   a cutout defined centrally in the rear edge of said platform member for fitting around an automobile jack so as to permit the positioning of said dolly below the lateral frame member or axle of an automobile when the frame member or axle is jacked up by an automobile jack engaging the center portion of the axle or frame member.

2. The invention defined in claim 1, including:
   a rigid planar extension member mounted to extend centrally from the forward edge of said platform member substantially in the plane thereof, said extension member having an upper and lower surface; and
   a caster mounted on the lower surface of said extension member to project vertically downward therefrom.

3. The invention defined in claim 2, wherein said casters mounted on said platform member are the same size and said caster mounted on said extension member is of a smaller size than said casters mounted on said platform member.

4. The invention defined in claim 2, wherein:
   said casters mounted along said forward edge are larger than said casters mounted along said rear edge; and
   said casters mounted along said rear edge are larger than said caster mounted on said extension member.

5. The invention defined in claim 1, wherein the channels defined by said cradle members are semicylindrically shaped.

6. The invention defined in claim 1, wherein the channels defined by said cradle members are rectangularly shaped.

7. The invention defined in claim 1, wherein said means mounting said cradle members on said brace structures includes a structural member mounted to extend between said brace structures, said structural member defining a horizontally extending guide channel, said mounting means also including first and second carriage members mounted in said guide channel for lateral movement therealong, said first and second cradle members being rigidly secured to, respectively, said first and second carriage members, said mounting means further including key means for securing said carriage members in place at selected locations in said guide channel.

8. The invention defined in claim 1, including:
   an additional caster; and
   means mounting said additional caster on said dolly in a position centrally ahead of the forward edge of said platform member to project downwardly to a point a selected distance above the common plane defined by said casters mounted in the corners of said platform member whereby said additional caster prevents said dolly from tipping over when rolled forwardly across a crack or other obstruction.

9. A dolly for moving an automobile, comprising:
   structure defining along a substantially horizontally extending axis a pair of upwardly opening laterally spaced apart cradles for receiving and supporting a structural member on the underside of an automobile, said structure also defining a cutout substantially equidistant from said spaced apart cradles for fitting around an automobile jack so as to permit the positioning of said dolly below the lateral frame member or axle of an automobile when the frame member or axle is jacked up by an automobile jack engaging the center portion of the axle or frame member;
   a plurality of casters, said structure being mounted on said casters for stably supporting an automobile while being rolled across a floor surface and the lowermost positioned wheel portions of said plurality of casters defining a common plane, said horizontally extending axis of said cradles extending over the area enclosed by imaginary lines drawn between adjacent ones of said plurality of casters; and
   an additional caster mounted on said structure a selected distance outside of the area enclosed by the imaginary lines drawn between adjacent ones of said plurality of casters, said additional caster being mounted on said structure to extend downwardly to a selected distance above said common plane and being for preventing said dolly from tipping over when rolled across a crack or other obstruction with said additional caster positioned ahead.

10. The invention defined in claim 9, wherein said additional caster is mounted substantially equidistant from said spaced apart cradles.

* * * * *